(No Model.)

H. HAHN.
CHIMNEY VENTILATOR.

No. 260,564. Patented July 4, 1882.

Witnesses:
Theo. G. Hoster
C. Sedgwick

Inventor:
H. Hahn
By Munn & Co.
Attys.

UNITED STATES PATENT OFFICE.

HERMANN HAHN, OF SCHÖNBERG, MECKLENBURG-STRELITZ, GERMANY.

CHIMNEY-VENTILATOR.

SPECIFICATION forming part of Letters Patent No. 260,564, dated July 4, 1882.

Application filed March 25, 1882. (No model.)

*To all whom it may concern:*

Be it known that I, HERMANN HAHN, of Schönberg, in the Grand Duchy of Mecklenburg-Strelitz and Empire of Germany, have invented certain new and useful Improvements in Chimney-Ventilators, of which the following is a full, clear, and exact description.

The object of my invention is to prevent wind from creating a back draft in chimneys and smoke-stacks, but on the contrary to create a very strong upward draft in the chimney or smoke-stack.

The invention consists in a cowl adapted to be mounted to turn on a chimney or smoke-stack, which cowl is provided at the open end with a series of concentric funnels and at the closed end with a wind-deflector.

The invention further consists in wings attached to the outer funnel for turning the cowl, so that the wind cannot pass into the open end of the same.

Reference is to be had to the accompanying drawings, forming part of this specification, in which similar letters of reference indicate corresponding parts in all the figures.

Figure 1:
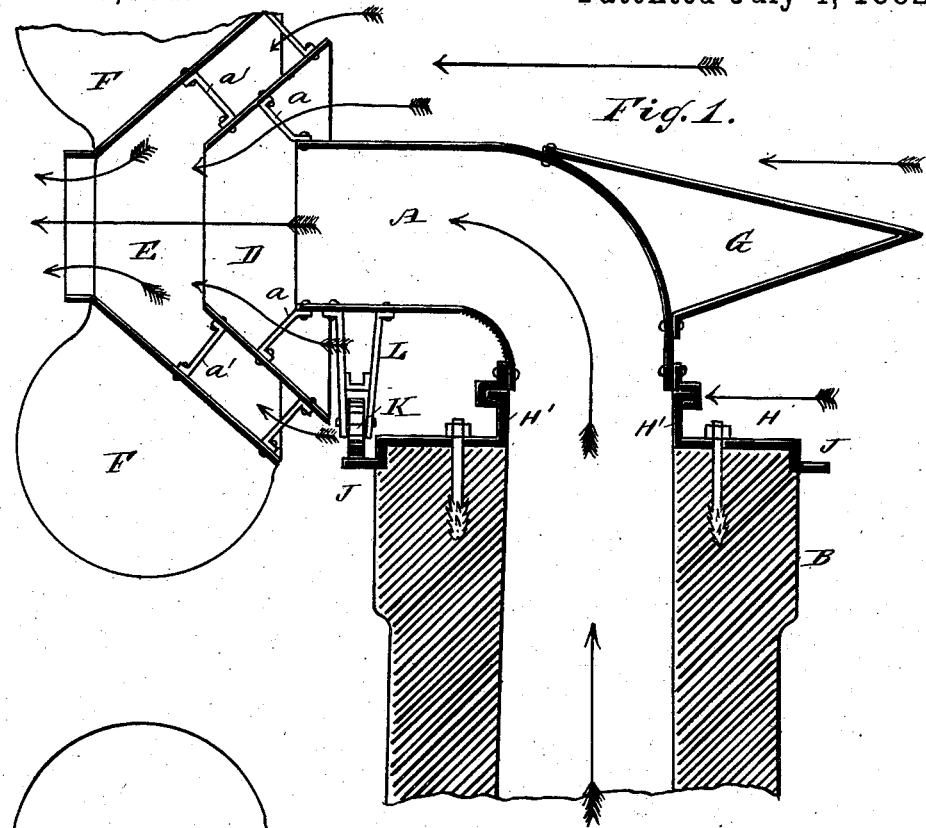
Figure 2:
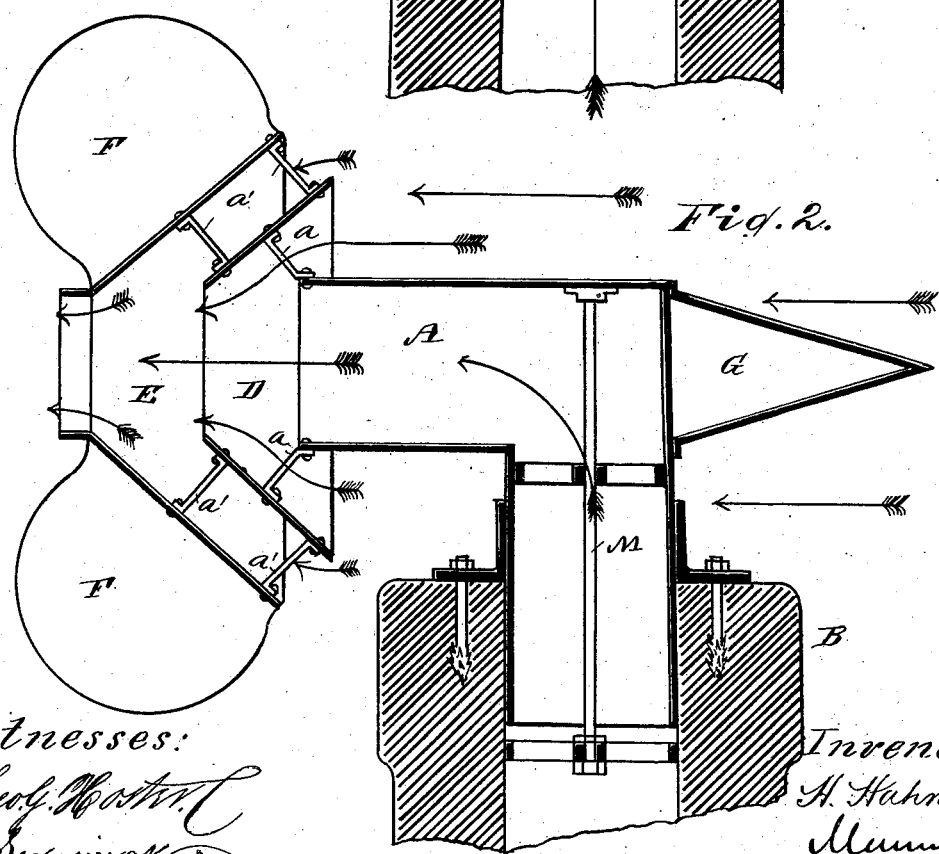

Figure 1 is a longitudinal sectional elevation of my improved chimney-ventilator. Fig. 2 is a longitudinal sectional elevation of a modification of the same.

An angular cowl, A, is mounted to turn freely on the top of a chimney, B, or a locomotive smoke-stack, C. Two concentric funnels, D and E, are attached to the open end of the cowl A in such a manner that the larger openings of the funnels D E will be toward the open end of the cowl. The smaller funnel, D, is held to the head of the cowl A by angle-irons $a$, and the larger funnel, E, is attached to the funnel D by means of angle-irons $a'$ in such a manner that annular openings through which the wind can pass will be formed between the end of the cowl and between the funnels. The smaller funnel, D, projects into the larger funnel, E, as shown. Two vertical wings, F, are attached to the outer funnel, E, and a wind-deflector, G, projects from the closed end of the cowl. If desired, the wings F may be dispensed with.

In Fig. 1, the top plate, H, of the chimney forms a circular track, J, on which a roller, K, runs, journaled in the lower end of a frame, L, for supporting the overhanging part of the cowl A, which is held free to turn on the upper end of a collar, H', of the top plate, H.

In Fig. 2, the vertical part of the cowl passes into the chimney, and the cowl turns on a central shaft, M, in this vertical part of the cowl. In this case the cowl must be carefully balanced.

The operation is as follows: The wind strikes against the wings F and turns the cowl in such a manner that the deflector G points in the direction from which the wind blows. The wind passes into the funnels and is compressed in the same, whereby its power and speed will be increased, and it produces a powerful suction, which draws the products of combustion out of the chimney, and forces them out through the front or smaller openings of the funnels, thereby creating a strong draft in the chimney and a more rapid combustion. The wind can never blow down the chimney, as the closed end of the cowl always projects toward the direction from which the wind blows, and the funnels D E ward off side gusts of wind.

Having thus fully described my invention, I claim as new and desire to secure by Letters Patent—

1. The combination, with the cowl A, of the concentric funnels D E, held on the open end of the same, with the larger openings toward the opening of the cowl, and of the wind-deflector G at the closed end of the cowl, substantially as herein shown and described, and for the purpose set forth.

2. The combination, with the cowl A, of the concentric funnels D E on the open end of the cowl, and the wings F on the outer funnel, E, substantially as herein shown and described, and for the purpose set forth.

3. The combination, with a chimney, of the top plate, H, forming a circular track, J, of the cowl A, provided with concentric funnels D E on the open end, the roller K, and the frame L, attached to the cowl A, and in which the roller K is journaled, substantially as herein shown and described, and for the purpose set forth.

HERMANN HAHN.

Witnesses:
JOHANNES BRANDT,
HUGO WILOSS.